(12) United States Patent
Shalev

(10) Patent No.: US 6,570,984 B1
(45) Date of Patent: May 27, 2003

(54) RING TRIP DETECTION CIRCUIT AND METHOD FOR SUBSCRIBER LINE INTERFACE

(75) Inventor: Moti Shalev, Lod (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 09/294,387

(22) Filed: Apr. 20, 1999

(51) Int. Cl.⁷ .................................. H04M 3/02
(52) U.S. Cl. ........................... 379/382; 379/383
(58) Field of Search .............................. 379/382

(56) References Cited

U.S. PATENT DOCUMENTS

| | | | |
|---|---|---|---|
| 4,310,728 A | * 1/1982 | Dumont .................. | 379/252 |
| 4,355,206 A | * 10/1982 | Israel et al. ............ | 379/378 |
| 4,447,673 A | 5/1984 | Elliott et al. ........... | 379/253 |
| 4,731,828 A | 3/1988 | Basehore ................ | 379/382 |
| 4,827,503 A | 5/1989 | Takato et al. ......... | 379/373.01 |
| 5,402,482 A | 3/1995 | Minohara et al. ...... | 379/377 |
| 5,684,874 A | 11/1997 | Yagyu et al. .......... | 379/382 |
| 5,706,342 A | 1/1998 | Baeder et al. ......... | 379/382 |
| 5,734,712 A | 3/1998 | Randahl ................. | 379/382 |

* cited by examiner

Primary Examiner—Forester W. Isen
Assistant Examiner—Daniel Swerdlow
(74) Attorney, Agent, or Firm—Browdy and Neimark, P.L.L.C.

(57) ABSTRACT

A ring trip detector circuit and method for use with a plurality of subscriber line interface circuits each having at least one telephone unit connected to it, having a ring generator for feeding a ringing voltage to the subscriber line interface circuits, and which detects when at least one of the subscriber units goes off-hook. The voltage level of the ringing voltage is compared with a predetermined level so as to detect when any one of the ringing subscriber telephone units goes off-hook. Thereafter, each of the plurality of subscriber line interface circuits is sequentially disconnected from the ring generator, and reconnected only in the absence of an off-hook condition in the disconnected subscriber telephone unit. The ringing voltage thereby remains fed to all ringing subscriber lines for which all connected equipment is on-hook.

6 Claims, 7 Drawing Sheets

RING TRIP DETECTION CIRCUIT AND METHOD FOR SUBSCRIBER LINE INTERFACE

FIELD OF THE INVENTION

This invention relates to ring trip detection circuits.

BACKGROUND OF THE INVENTION

In order to address the need to provide more telephone extension lines at the premises of subscribers, whilst minimizing the total length of copper wire used, pair gain systems have become popular wherein several telephone lines are served over a single or double pair of wires from a central office. This single or double pair of wires comes from an exchange unit co-located with the central office, and are connected to a remote unit (RU) near the subscribers. These remote units, also known as network termination units (NTU), are typically powered via a DC voltage which is also fed along those same wires from the exchange unit. The NTU must act as the central office to the attached subscribers, supplying them among other things with DC loop voltage for operation, and an AC ringing voltage when a subscriber is being called. When one of the attached subscriber lines is called, the exchange unit sends a signal to the NTU to ring that subscriber line, and the NTU in turn sends an A.C. ringing voltage to the line for energizing the ringers of the telephone extension units or other equipment connected to that subscriber line, generally known as Customer Premises Equipment (CPE). When someone answers one of the telephone extension units, this must be detected and the ringing voltage removed from the answered telephone line within approximately 200 ms, since otherwise the a.c. ringing voltage creates high volume noise through the telephone earpiece causing significant discomfort to the called subscriber.

In practice, it is most convenient for the NTU to generate one ringing voltage for all connected subscribers at once, and simply connect the ringing voltage to all subscribers who are being called at that instance. As a result, while one subscriber may have answered the line, the ringing signal may still need to be sent to other subscriber lines which are connected to the same NTU. Therefore, whilst the AC ringing voltage must be quickly removed from the subscriber line which goes off-hook, this must be done in a manner which does not perceptibly halt the ring signal to other subscriber lines which are connected to the NTU and which remain on-hook and to which a call is also directed.

Conventionally, this requirement is addressed by providing a ring trip detector in each subscriber line interface circuit (SLIC) so that when the receiver of an attached CPE is lifted (i.e. the telephone extension unit goes "off hook"), this is detected and the ring signal is interrupted to the telephone line. However, in a system having multiple telephone lines connected to a single NTU, this multiplies the number of ring trip detectors thus required and increases the overall cost of the telephone system.

A typical prior art ring trip detector circuit is Lucent's L8551 Low Power SLIC chip which requires that each subscriber be provided with its own separate ring trip detector and off hook detector. The off hook detector on its own cannot function as a ring trip detector owing to the unbalanced nature of the AC ringing voltage relative to ground, thus requiring a separate trip detector for each subscriber line. Owing to the need to conserve power, during the application of the AC ringing voltage, the DC loop current is switched off from all ringing lines.

U.S. Pat. No. 4,447,673 (Elliott et al.) discloses a ring trip detector circuit adapted for use in a community office switching system that includes a call control processor and a port event processor. The call control processor and port event processor interact through a port storage unit that contains information corresponding to each individual telephone line connected to the switching system. The switching system also includes a ringing generator for transmitting ringing signals onto a telephone line to a called party. Windings for a common bridge relay connect in circuit with each telephone line and diodes shunt the windings so the relay responds only to signals of one polarity. The contacts of the common bridge relay, therefore, reflect the duty cycle of the signal through the common bridge relay and this duty cycle varies for each telephone line when the called party goes off-hook during a ringing burst. The common bridge relay produces a supervisory signal that is sampled and transferred, for each telephone line, to a corresponding port storage area. A single ring trip analyzer sequentially monitors each port storage means during a ringing operating to determine whether the supervisory signal indicates that the called instrument has been taken off-hook. When this occurs, the analyzer updates control information in a corresponding port storage area to control the state of a ring delay. The ring delay then opens and removes the ringing signal from the corresponding telephone line. The analyzer also detects off-hook status during intervals between successive ringing bursts and during normal operations when a subscriber lifts a telephone off-hook in order to place a call. The operation of this circuit requires a sufficient direct current component in the ringing signal to operate a relay, and is thus not suitable for an NTU where the supply of power is limited.

U.S. Pat. No. 4,731,828 (Basehore) discloses a ring trip detection circuit in a telecommunications exchange wherein the ringing signal applied to a customer line is limited to provide a square wave output. Since when the customers instrument is "on hook" virtually no direct current flows in the line, the square wave output has substantial 50—50 duty cycle and when the customer instrument goes "off hook" the DC alters that duty cycle, by sampling the square wave signal and counting in one direction for positive samples and in the opposite direction for negative samples, any significant change in the duty cycle causes a counter to exceed a ring-trip threshold fairly rapidly. The operation of this circuit also requires a sufficient direct current component in the ringing signal to operate a relay, and is thus not suitable for an NTU where the supply of power is limited. In addition, each telephone line requires its own ring trip detection circuit which is costly.

U.S. Pat. No. 4,827,503 (Takato et al.) discloses a constant current circuit, including a constant current source which draws a current and a constant current source which sends a current, is connected to a two-wire subscriber line. A ringing signal made up of constant stream of positive and negative current signals is transmitted to the telephone line. The off-hook condition of each telephone line is detected by comparing the output voltage across a resistor with a reference voltage for ring trip. The operation of this circuit also requires a sufficient direct current component in the ringing signal to operate a relay, and is thus not suitable for an NTU where the supply of power is limited. In addition, each telephone line requires its own ring trip detection circuit which is costly.

There is therefore a need for a ring trip detection circuit that does not require the supply of a sufficient direct current source for operation during a ringing signal, and does not ring an individual ring trip detector for each subscriber line.

SUMMARY OF THE INVENTION

It is therefore an object of the present invention to provide a single ring trip detector circuit and method for a subscriber line interface circuit having a plurality of subscriber telephone lines connected thereto and which allows the AC ringing voltage to be quickly removed from a subscriber line which goes off-hook, without halting the ring signal to other subscriber lines which remain on-hook and to which a call is also directed.

According to a first aspect of the invention there is provided a method for ring trip detection for use with a plurality of subscriber line interface circuits (SLIC) each having at least one Customer Premises Equipment (CPE) connected thereto and being coupled to a ring generator for feeding a ringing voltage to said plurality of subscriber line interface circuits, the method comprising:

(a) comparing a function of the ringing voltage with a predetermined reference so as to detect when one or more CPEs of the one or more ringing subscriber lines goes off-hook, (b) disconnecting each of the plurality of subscriber lines from the ring generator, (c) detecting for each of the disconnected subscriber lines whether it has a CPE in an off-hook condition, and if not (d) reconnecting the disconnected subscriber line to the ring generator.

According to a second aspect of the invention there is provided a ring trip detector circuit for a plurality of subscriber line interface circuits (SLIC) each having at least one customer premises equipment (CPE) connected thereto and being coupled to a ring generator for feeding a ringing voltage to said plurality of subscriber line interface circuit, the ring trip detector circuit comprising:

a comparator for comparing a function of the ringing voltage with a predetermined reference so as to detect when at least one CPE of the at least one ringing subscriber goes off-hook and producing a comparator detect signal, a control circuit coupled to the comparator and being responsive to the comparator detect signal for producing a disconnect signal, a switching circuit coupled to the control circuit and responsive to the disconnect signal for disconnecting each of the plurality of subscriber lines from the ring generator, and a respective off hook detector for each subscriber line being coupled to the control circuit for detecting an off hook condition for the respective subscriber line in an absence of said ringing voltage;

the control circuit being responsive to at least one of the off hook detectors for reconnecting a respective ringing subscriber telephone line that is not off hook.

Preferably, the control circuit is realized in software using a suitably programmed microprocessor having a sufficiently fast clock rate to allow rapid disconnection and sampling of the subscriber units, so that the ringing signal can be disconnected from a called subscriber unit which goes off-hook in less than 200 ms.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1A:
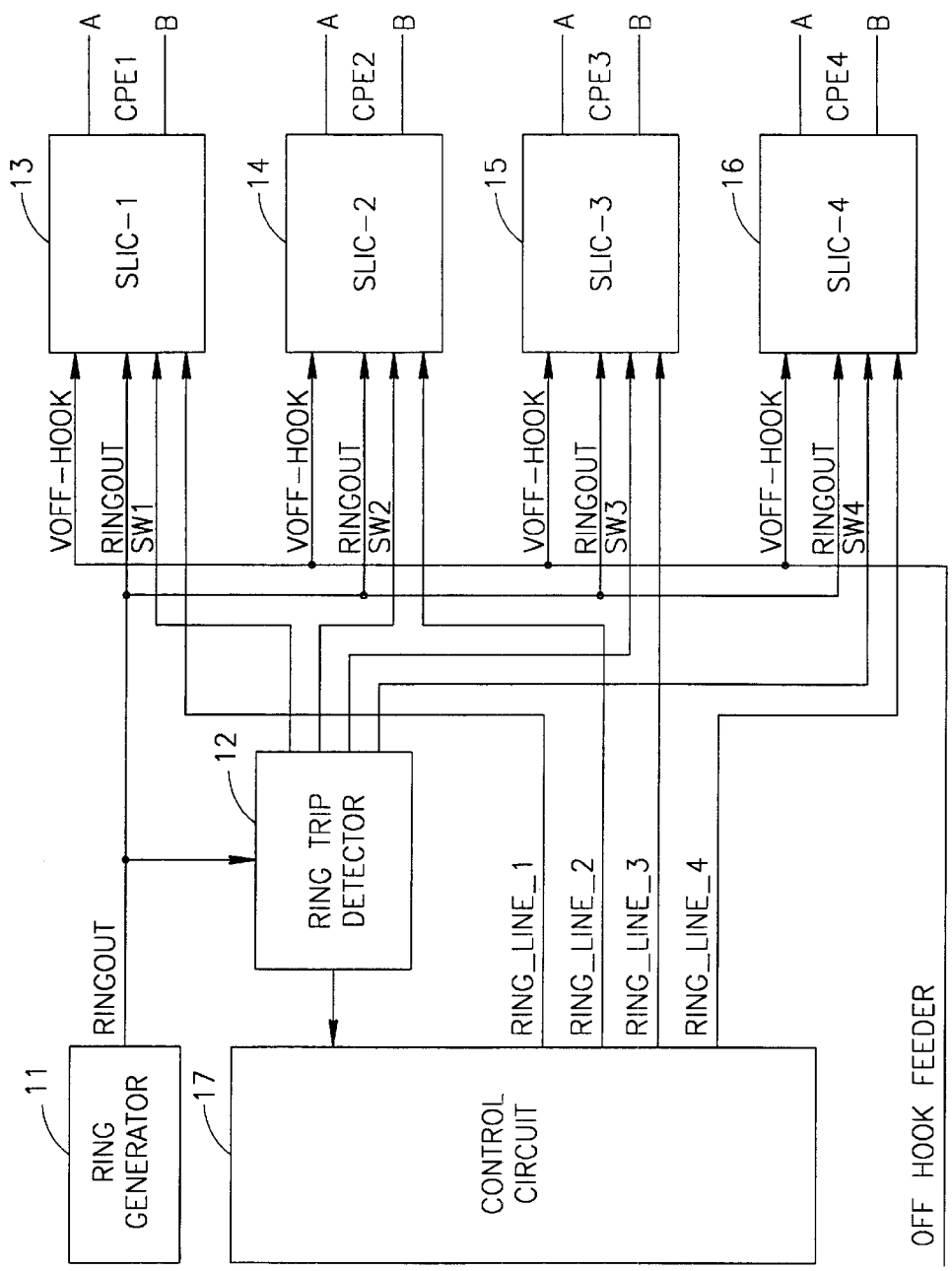
FIGS. 1A and 1B are a block diagram showing functionally a remote unit having a plurality of SLIC's each connected to Customer Premises Equipment (CPE)

FIG. 1A shows a block diagram of a remote unit (RU) depicted generally as 10 which comprises a ring generator 11 commonly connected to a plurality of SLIC's, designated SLIC-1 to SLIC-4. It is to be understood that the invention will be described in relation to a pair gain system operating four separate phone lines, without being limiting in any way. Each SLIC is itself connected to Customer Premises Equipment (CPE) via two wires, A and B conventionally known as Tip and Ring wires. The ring generator 11 is also connected to a single ring trip detector 12, which operates to detect when one or more of the attached ringing CPE-s have gone off-hook. The ring trip detector 12 has a plurality of outputs, labeled SW1 to SW4, each for operating a respective one of the SLICs. A control circuit 17 is connected over the pair gain system to the exchange unit (not shown) which signals the control circuit to ring one or more of the attached lines. The control circuit 17 has a separate output for each SLIC labeled Ring__line__1 to Ring__line__4, respectively, that enables the ringing of the CPE connected to the appropriate SLIC. An off hook feeder consists of the DC feeder voltage for the units, and is connected to each SLIC. The feeder voltage, labeled as Voff-hook, is used to operate the CPE in an off-hook mode, for actually carrying voice or data as is well known in the art.

Figure 1B:
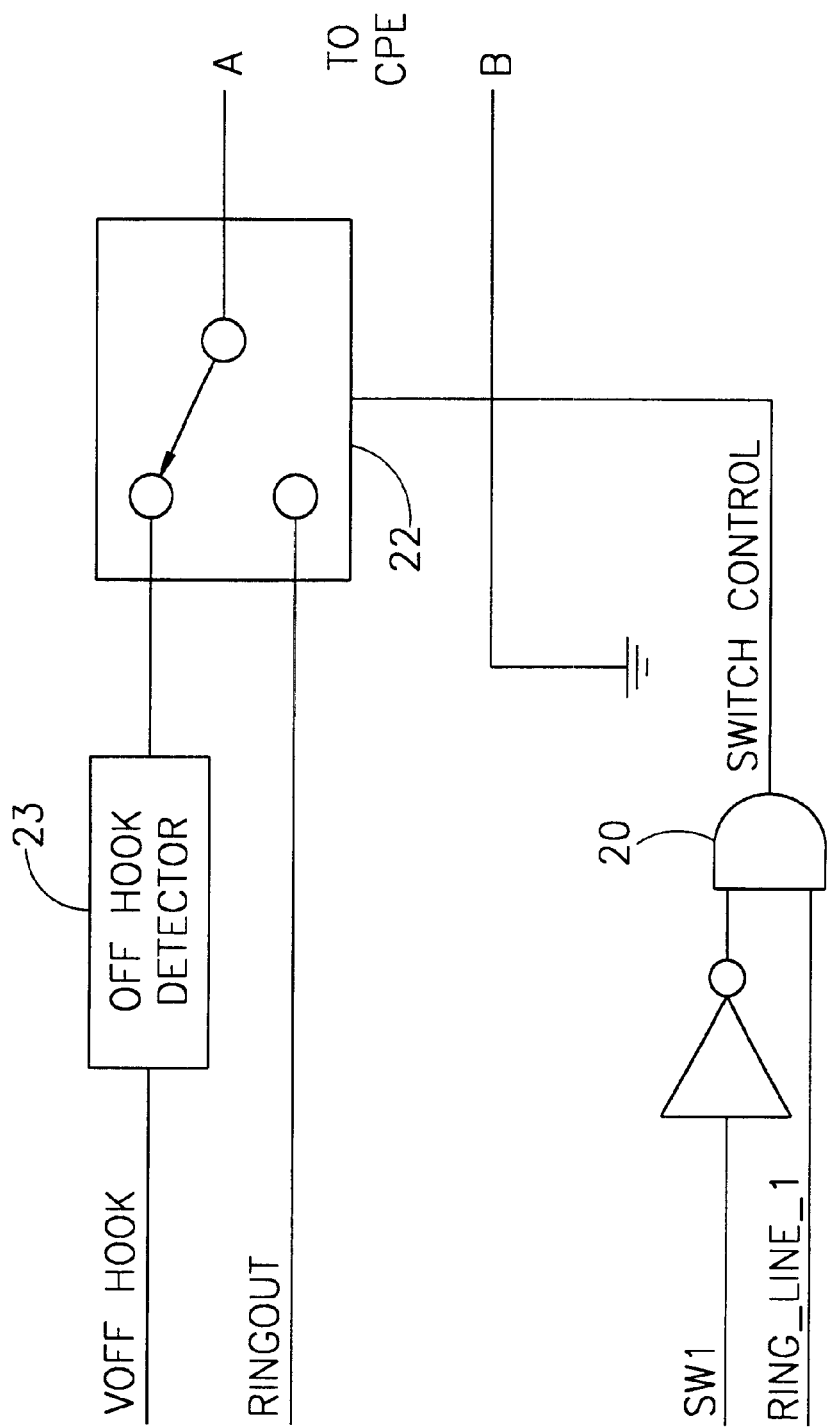

FIG. 1B shows schematically a detail of one of the SLIC's shown in FIG. 1A. Ring__line__1, which is active only when a ringing signal is to be sent to phone line 1, is connected to one input of a 2-input logical AND gate 20. Control signal SW1, which is active when the ring trip detector 12 detects an off hook condition for any of the ringing lines, is passed through an inverter 21 to the other input of the AND gate 20. Thus the output of the AND gate 20 is active only when phone line 1 is to be signaled with a ring signal, and the ring trip detector 12 has not detected an off-hook condition on any ringing line. When active, it operates to close Ringer Switch 22 to connect the Ringout voltage to the CPE, causing the subscriber units to ring. If the output of gate 20 is inactive, then Voff-hook is connected to the CPE which will allow the Off Hook Detector circuit 23 to detect whether the CPE is in an on hook or off hook state. An active control signal SW1 constitutes a disconnect signal for disconnecting the ringing voltage from the respective subscriber line (in this case line 1) and is produced by the control circuit 17 when at least one CPE of a ringing subscriber goes off-hook thereby producing a comparator detect signal.

Figure 2:
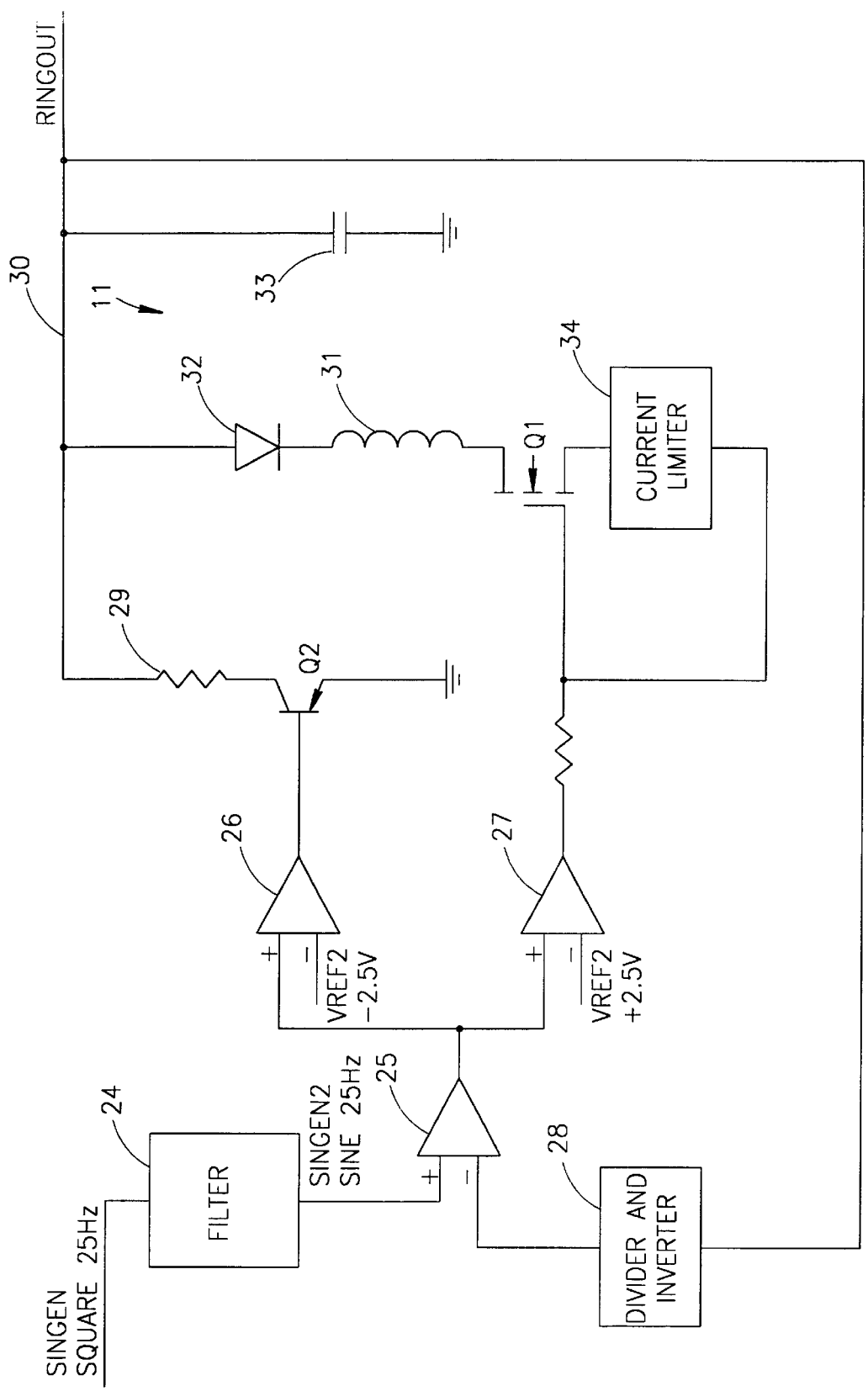
FIG. 2 shows schematically a detail of the Ring Generator circuit shown functionally in FIG. 1.

FIG. 2 shows a more detailed block diagram of the ring generator 11, which uses an unbalanced AC ringing signal.

A square wave signal of the appropriate frequency for the ringer, typically 25 Hz is input as Singen. The Singen square wave is passed through a filter 24, where it is smoothed into a 25 Hz sine wave with a DC offset—Singen2. This sine wave signal is fed into the non-inverting input of a comparator 25, which then drives comparators 26 and 27. The inverting input of the comparator 25 is connected via a standard voltage divider and inverter circuit shown as block 28, to the output ringing signal (RINGOUT), in a closed feedback loop. The comparator 26 has its non-inverting input connected to the output of the comparator 25, and its inverting input set to a reference voltage of −2.5 V DC. Thus, when Singen2 is greater than the fedback signal, the output of the comparator 25 is high, thereby ensuring that the output of the comparator 26 must be high because its inverting input is negative. This effectively shuts off Q2 which is a PNP bipolar junction transistor. The collector of the transistor Q2 is connected via a resistor 29 to a voltage rail 30 from which the RINGOUT voltage is derived.

The inverting input of the comparator 27 is set to +2.5 V DC, such that when the output of the comparator 25 is high and exceeds 2.5 V DC, the output of the comparator 27 will also be high, thus turning on the MOSFET Q1. An inductor 31, connected to the collector of Q1, is constituted by the secondary winding of a transformer, whose primary winding is connected to a conventional PWM circuit (not shown) for generating a high frequency AC voltage from a DC input. A diode 32 in series with the inductor 31 rectifies the AC, and current flow begins in the direction of $I_1$, causing the RINGOUT voltage seen at the voltage rail 30 to diminish (become more negative). A capacitor 33 is connected between the voltage rail 30 and GND and serves to smooth out the resulting RINGOUT waveform. RINGOUT continues to become more and more negative, until the signal fed back to the comparator 25 (after inversion and division) becomes greater than Singen2. The comparator 25 then outputs a negative voltage, which shuts off Q1 by way of the comparator 27, and by way of the comparator 26 feeds current to the base of Q2 which thus begins to allow the voltage to rise back towards zero. Since Singen2 has a DC offset, Ringout will also have a DC offset. The maximum value actually reached is set at approximately −25 Volts. The input to Q1 is also controlled by a current limiter 34, whose function will be described further below.

Figure 3:
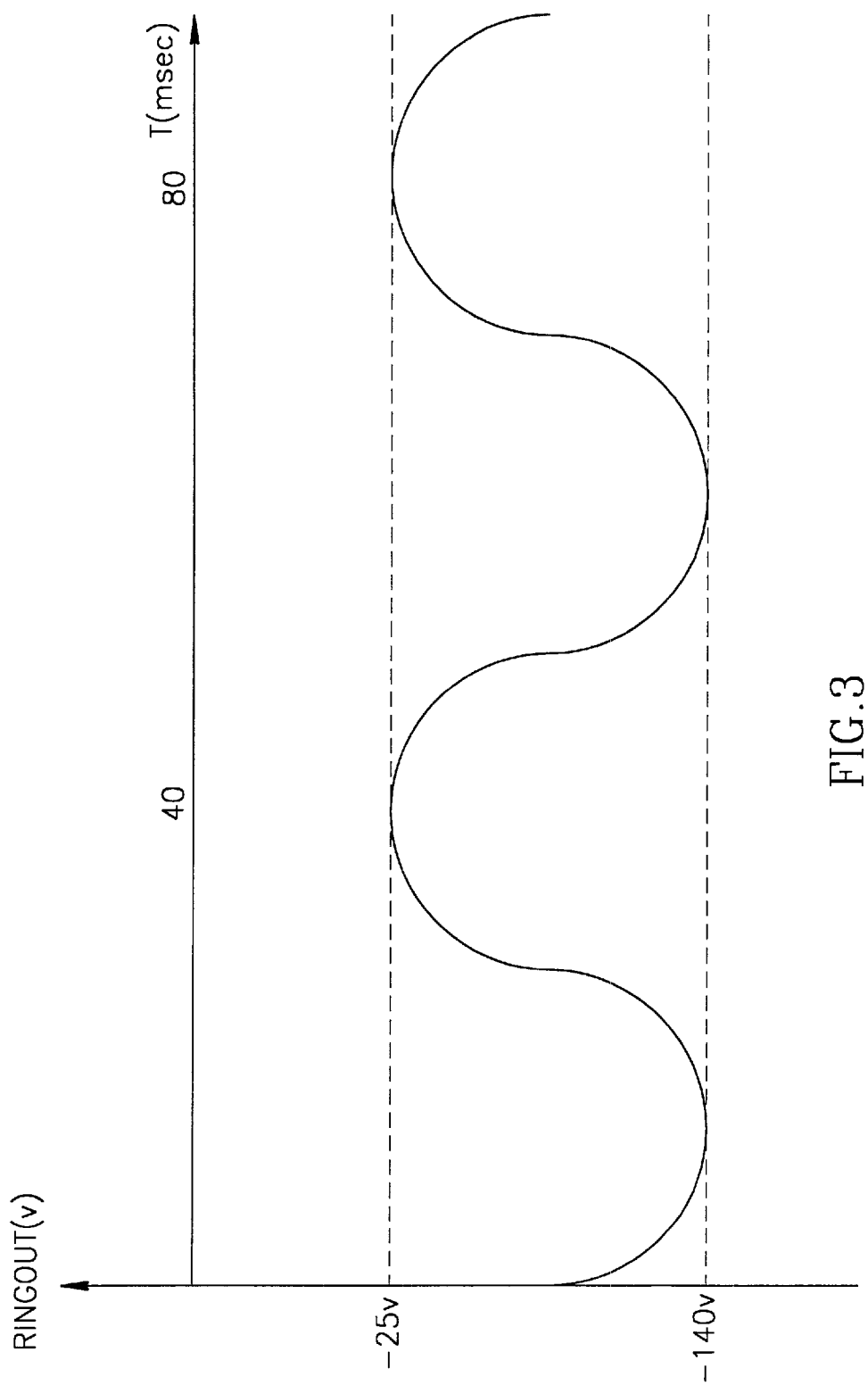
FIG. 3 is a pictorial representation of the normal ringer output of the Ring Generator circuit shown in FIG. 2.

FIG. 3 shows the normal RINGOUT output voltage on rail 30 in the situation when all telephones that are connected are on-hook, thus presenting a typical load of approximately 1 REN (Ring Equivalent Number) or less. The voltage waveform is approximately sinusoidal operating from −25 Volt to −140 Volt.

Figures 4, 5:
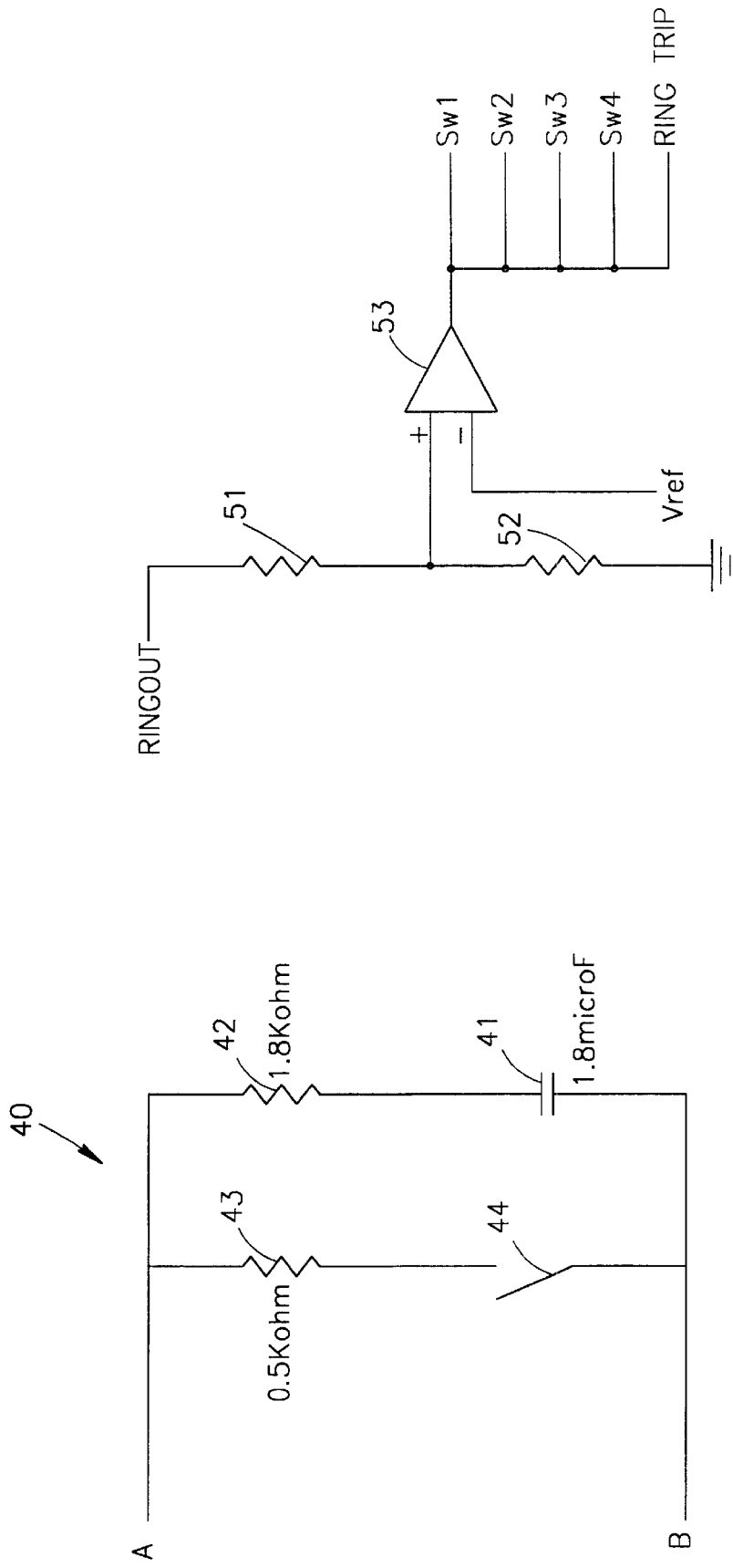
FIG. 4 is a schematic representation of the equivalent circuit of a typical CPE shown in FIG. 1.
FIG. 5 is a block diagram showing functionally a ring trip detection circuit according to the invention for effecting ring trip detection in the subscriber line interface shown in FIG. 1.

FIG. 4 shows a typical representation of a CPE designated generally as 40 and represented as a primary load constituted by a 1.8 $\mu$F capacitor 41 and a 1.8 K$\Omega$ resistor 42 connected in series and being connected in parallel with a 500 $\Omega$ resistor 43 in series with a switch 44. When the extension unit is on hook, the switch 44 is open, and a totally blocked DC condition exists, while AC is passed through the unit constituted by the series connection of the capacitor 41 and the resistor 42. When the unit is placed off hook, the switch 44 is closed, allowing for DC flow, and connecting an equivalent resistive load of approximately 500 $\Omega$ across the primary load constituted by the capacitor 41 and the resistor 42.

Referring back to FIG. 2, it is seen that the input to MOSFET Q1 is also controlled by the current limiter circuit 34. Thus, when switch 44 in the CPE 40 shown in FIG. 4 is closed, a large current begins to flow, which operates on the current limiter 26 to shut down the MOSFET Q1. Without MOSFET Q1 operating, only the pull up transistor Q2 is left functioning, which will allows the RINGOUT voltage to approach zero rapidly. The rising voltage is detected by the Ring Trip detector 12 (shown in FIG. 1A.)

FIG. 5 shows a more detailed block diagram of the ring trip detector 12. The voltage rail 30 from which the RINGOUT signal is derived is connected via a voltage divider 50 comprising resistors 51 and 52 to the non-inverting input of a comparator 53. The inverting input of the comparator 53 is connected to a fixed DC reference voltage $V_{REF}$, which may be realized by connecting to a negative voltage source via a voltage divider network. The output of the comparator 53 will remain negative as long as the maximum RINGOUT voltage after division by the voltage divider 50 does not exceed $V_{REF}$. Since $V_{REF}$ is a negative voltage, as RINGOUT becomes more positive and approaches zero, it will cross the $V_{REF}$ reference voltage causing the output of the comparator 53, corresponding to SW1 to SW4, to become positive. The output SW1 to SW4 of the comparator 53 thus constitutes a comparator detect signal which is active whenever any one of the ringing CPE from any ringing line is taken off hook.

Figure 6A:
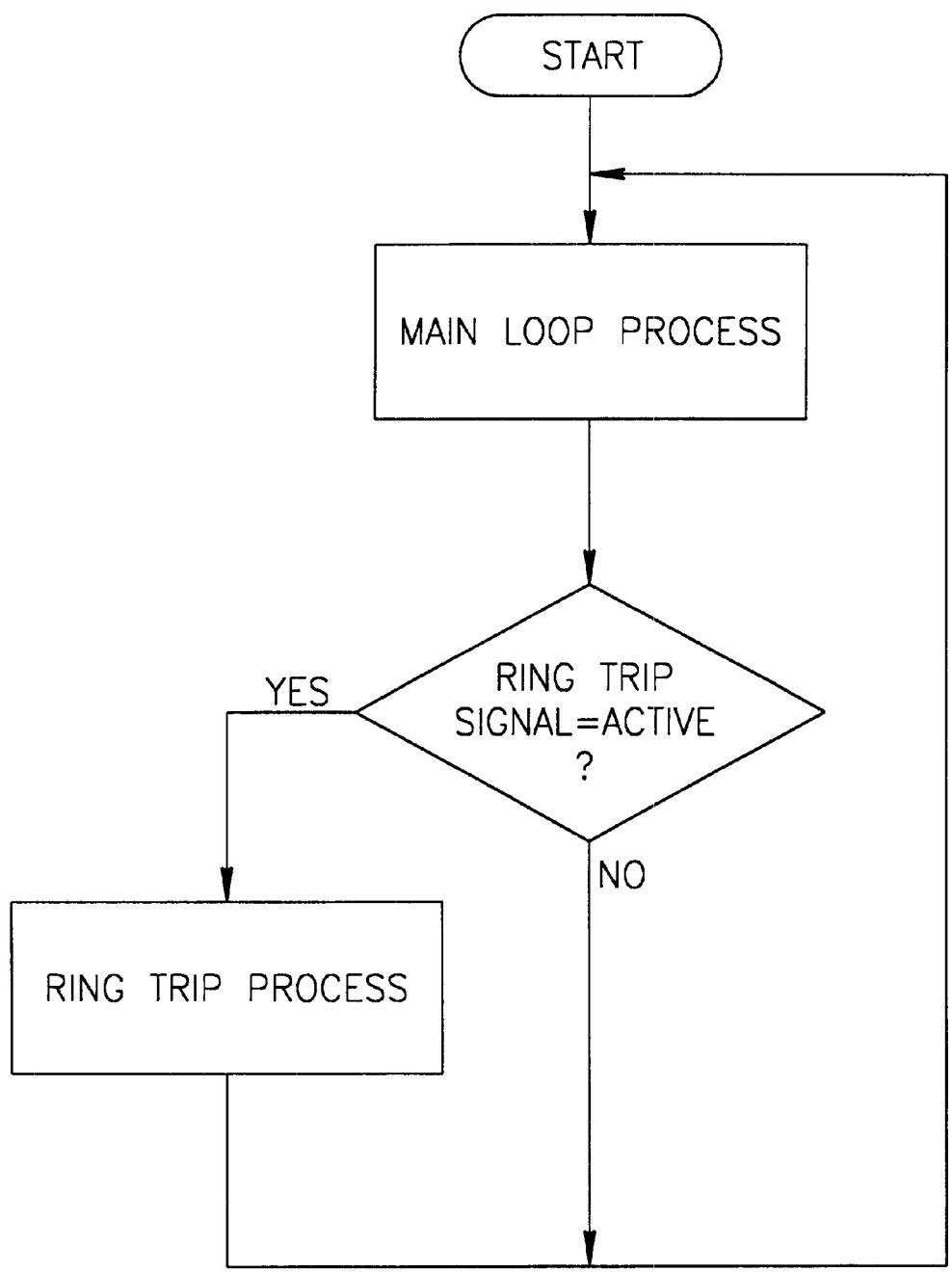
FIGS. 6A and 6B are a flow diagram showing the principal operating steps associated with a method according to the invention for effecting trip detection in the subscriber line interface shown in FIG. 1.
Figure 6B:
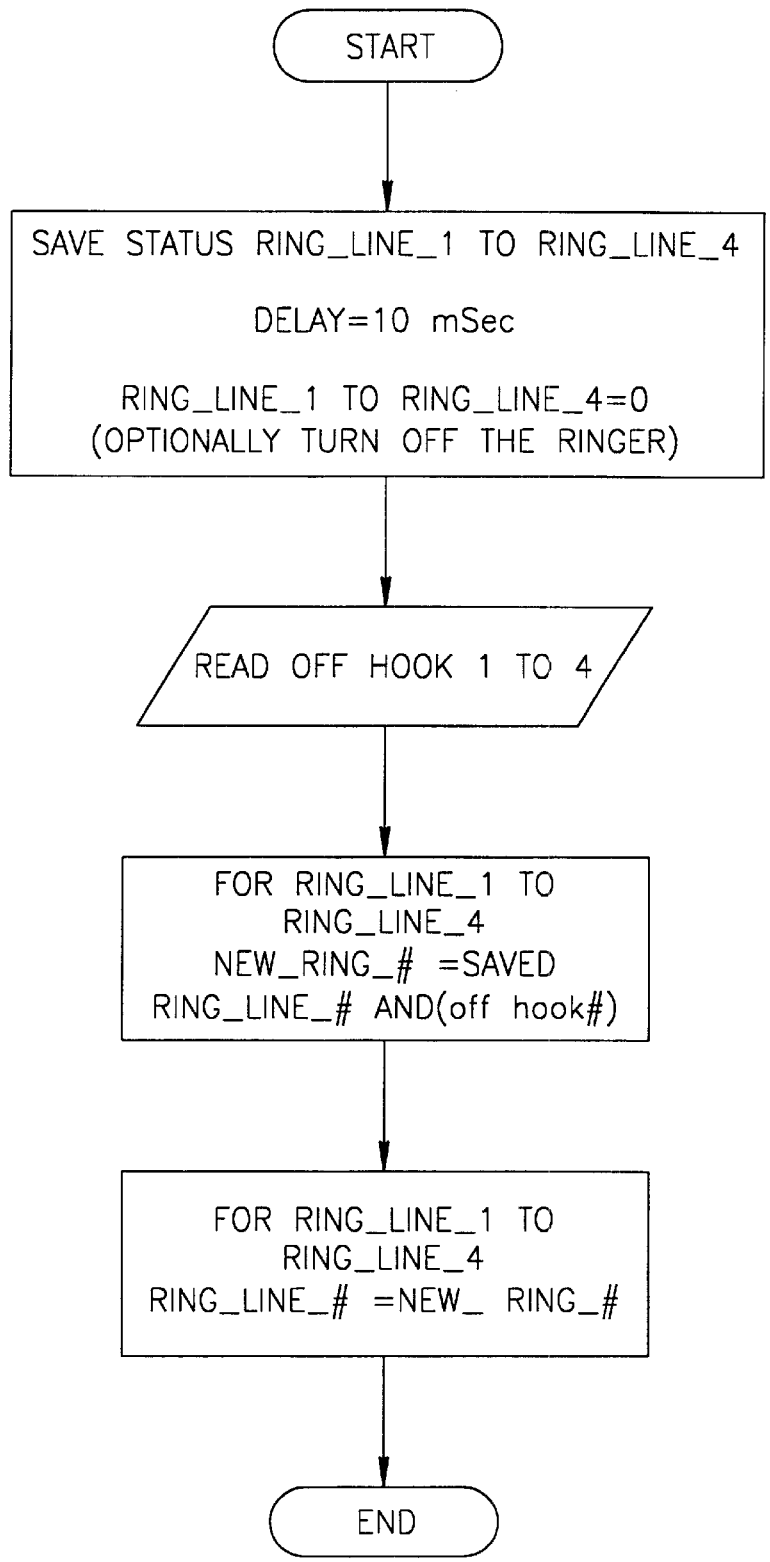

Referring to FIGS. 6A and 6B there are shown the principal operating steps carried out by the control circuit 17 of FIG. 1A which may be a suitably programmed processor. FIG. 6A shows a main loop procedure which is continually repeated and which includes a main loop procedure which checks for a ring trip signal (Ringtrip) output from the ring trip detector 12 of FIG. 1, and being commensurate with the rise of the divided Ringout voltage above $V_{REF}$ thereby signifying an off-hook condition in one of the CPEs connected to the ringing subscriber lines. Upon detection of a ring trip signal, the main loop procedure is interrupted and the ring trip process algorithm as shown in FIG. 6B is performed, whereafter control resumes to the main loop procedure shown in FIG. 6A.

As shown in FIG. 6B, the ring trip algorithm saves the current state of the ringing subscribers (i.e. the state of Ring_line_1 to Ring_line_4) and sets Ring_line_1 to 4 to zero, which effectively disconnects the Ringout voltage from all of the ringing lines by operating switch 22 and which connects all ringing subscribers to the regular loop DC current, to allow the normal off hook detector circuit to operate (FIG. 1B). A delay is inserted to allow for the operation of the ringer switches 22. Optionally the ring generator may be temporarily shut down as its output is not connected to any CPE. The normal off hook detector operates by detecting a DC current flow as is well known in the art. The off-hook state of all subscriber units is then read from the off-hook detector for each line and flagged, whereafter those subscribers which are on-hook and were in the ringing mode (Ring_line_# was active) are reconnected to the ringing circuit. This is accomplished by resetting the condition of Ring_line_1 to Ring_line_4. The reconnection to the ringing circuit may be done either after all off hook detectors have been read, or in an alternative embodiment, each one may be reconnected individually after its status has been checked. In this second alternative, the ringer generator should not be shut down. This is accomplished in a short amount of time, so that there is no audible break to the ringing sound. The ringing sine wave is typically of a 25 Hz signal, and as such a break of approximately 20 millisecond will not be audible. In practice the limiting factors are the speed of operation of the Ringer Switch 22 and the Off Hook detector 23, which using solid state circuitry can be accomplished in the order of 10–20 milliseconds which is not noticeable.

The above examples and description have been provided only for the purpose of illustration, and are not intended to limit the invention in any way. As will be appreciated by the skilled person, the invention can be carried out in a great variety of ways such as using prior art detection means to detect that any one of the plurality of CPE units that are connected to the ringing voltage source have gone off hook, other ringing voltage generators, comparing the actual AC waveform to a standard waveform, comparing any function of the ringing waveform to a standard, or sending a combined AC and DC voltage to ring the CPE units all without exceeding the scope of the invention as defined in the appended claims.

In the method claims which follow, alphabetic characters used to designate claim steps are provided for convenience only and do not imply any particular order of performing the steps.

What is claimed is:

1. A method for ring trip detection for use with a plurality of subscriber line interface circuits (SLIC) each having at least one Customer Premises Equipment (CPE) connected thereto and being coupled to a ring generator for feeding a ringing voltage to said plurality of subscriber line interface circuits, the method comprising:
   (a) comparing a function of the ringing voltage with a predetermined reference so as to detect when at least one CPE of the at least one ringing subscriber lines goes off-hook,
   (b) disconnecting each of the plurality of subscriber lines from the ring generator,
   (c) detecting for each of the disconnected subscriber lines whether it has a CPE in an off-hook condition, and if not
   (d) reconnecting the disconnected subscriber line to the ring generator, and
   wherein steps (b) and (d) are performed for each subscriber telephone line in turn prior to disconnecting a successive subscriber telephone line.

2. The method of claim 1, wherein step (c) is performed by an off-hook detector which is also utilized by the system for detecting an off-hook condition during a non-ringing state of the subscriber line.

3. The method of claim 1, wherein step (a) includes comparing a function of the ringing voltage with a reference DC signal.

4. A method for ring trip detection for use with a plurality of subscriber line interface circuits (SLIC) each having at least one Customer Premises Equipment (CPE) connected thereto and being coupled to a ring generator for feeding a ringing voltage to said plurality of subscriber line interface circuits, the method comprising:
   (a) comparing a function of the ringing voltage with a reference AC signal so as to detect when at least one CPE of the at least one ringing subscriber lines goes off-hook,
   (b) disconnecting each of the plurality of subscriber lines from the ring generator,
   (c) detecting for each of the disconnected subscriber lines whether it has a CPE in an off-hook condition, and if not
   (d) reconnecting the disconnected subscriber line to the ring generator, and
   wherein steps (b) to (d) are performed for each subscriber telephone line in turn prior to disconnecting a successive subscriber telephone line.

5. A ring trip detector circuit for use with a plurality of subscriber line interface circuits (SLIC) each having at least one Customer Premises Equipment (CPE) connected thereto and each being coupled to a ring generator for feeding a ringing voltage to said plurality of subscriber line interface circuits, said ring trip detector comprising:
   a comparator for comparing a function of the ringing voltage with a predetermined reference so as to detect when at least one CPE of the at least one ringing subscriber line goes off-hook and producing a comparator detect signal, wherein said comparator operates only on an AC level of the ringing signal,
   a control circuit coupled to the comparator and being responsive to the comparator detect signal for producing a disconnect signal,
   a switching circuit coupled to the control circuit and responsive to the disconnect signal for disconnecting each of the plurality of subscriber lines from the ring generator, and
   a respective off hook detector for each subscriber line being coupled to the control circuit for detecting an off hook condition for the respective subscriber line in an absence of said ringing voltage;
   the control circuit being responsive to at least one of the off hook detectors for reconnecting a respective ringing subscriber telephone line that is not off hook.

6. A ring trip detector circuit for use with a plurality of subscriber line interface circuits (SLIC) each having at least one Customer Premises Equipment (CPE) connected thereto and each being coupled to a ring generator for feeding a ringing voltage to said plurality of subscriber line interface circuits, said ring trip detector comprising:
   a comparator for comparing a function of the ringing voltage with a predetermined reference so as to detect when at least one CPE of the at least one ringing subscriber line goes off-hook and producing a comparator detect signal,
   a control circuit coupled to the comparator and being responsive to the comparator detect signal for producing a disconnect signal, and wherein the control circuit is responsive to the comparator detect signal for:
      (a) disconnecting each of the at least one ringing subscriber line from the ring generator,
      (b) detecting for each of the disconnected subscriber lines whether it has a CPE in an off-hook condition, and if not
      (c) reconnecting the disconnected subscriber line to the ring generator, and
   wherein steps (a) to (c) are performed for each ringing subscriber telephone line in turn prior to disconnecting a successive subscriber telephone line,
   a switching circuit coupled to the control circuit and responsive to the disconnect signal for disconnecting each of the plurality of subscriber lines from the ring generator, and
   a respective off hook detector for each subscriber line being coupled to the control circuit for detecting an off hook condition for the respective subscriber line in an absence of said ringing voltage;
   the control circuit being responsive to at least one of the off hook detectors for reconnecting a respective ringing subscriber telephone line that is not off hook.

* * * * *